United States Patent Office 3,520,418
Patented July 14, 1970

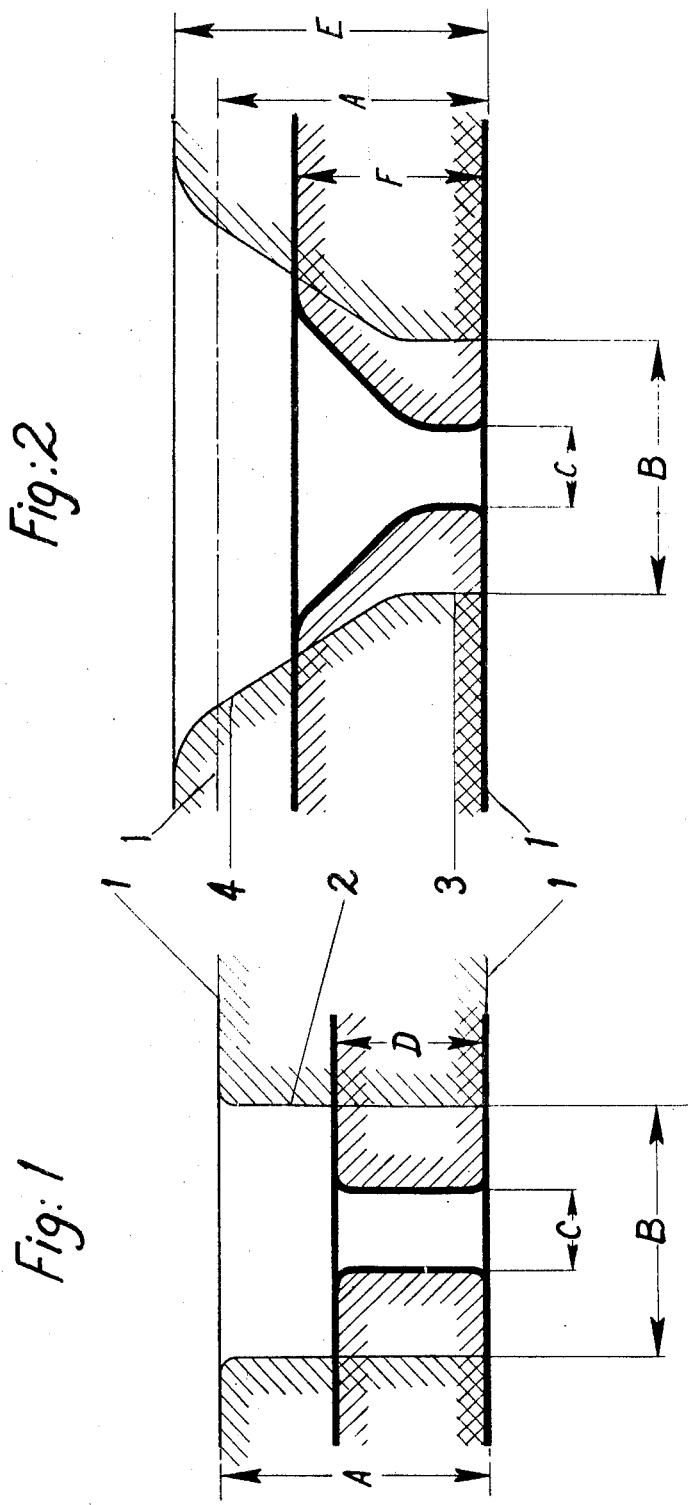

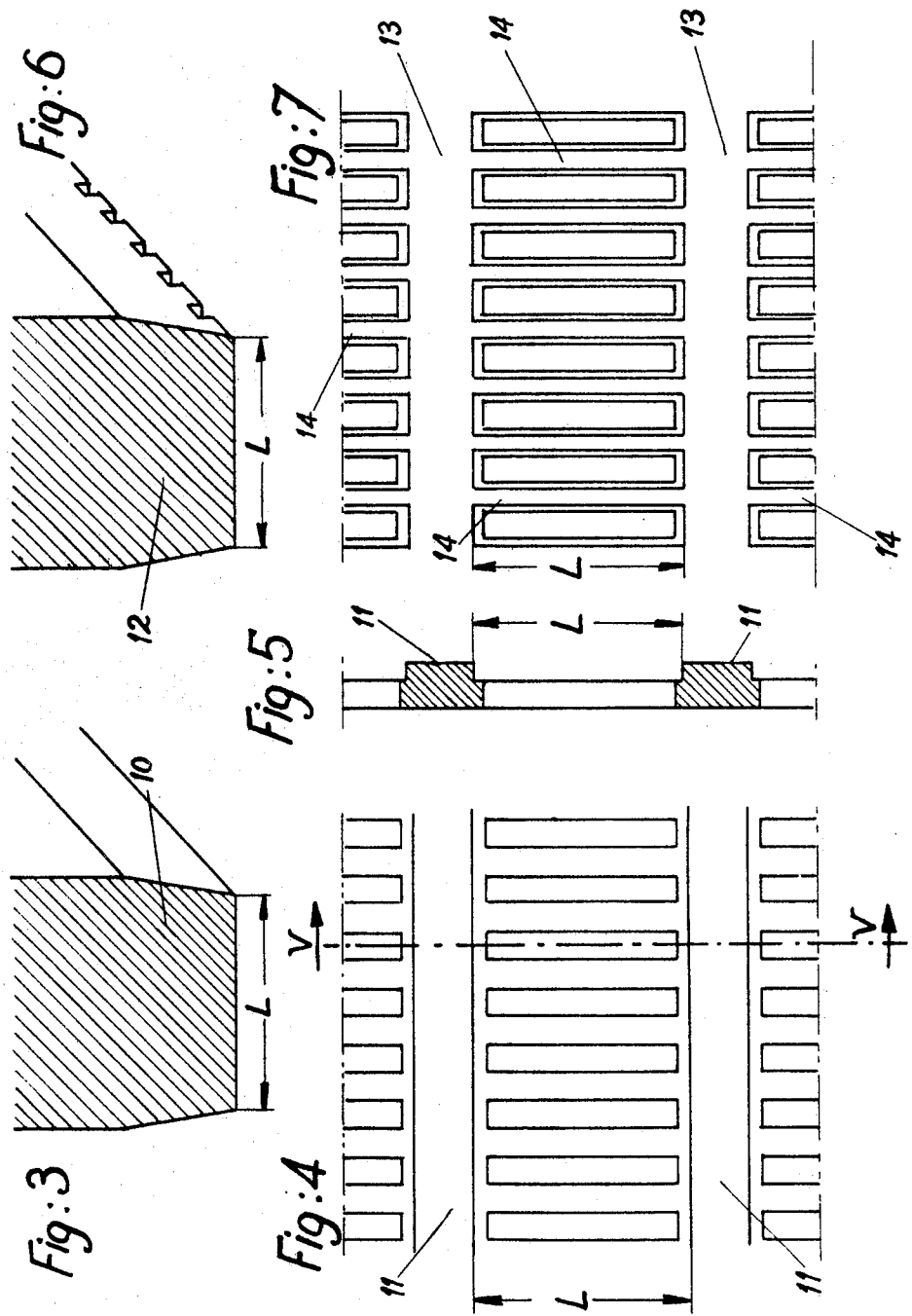

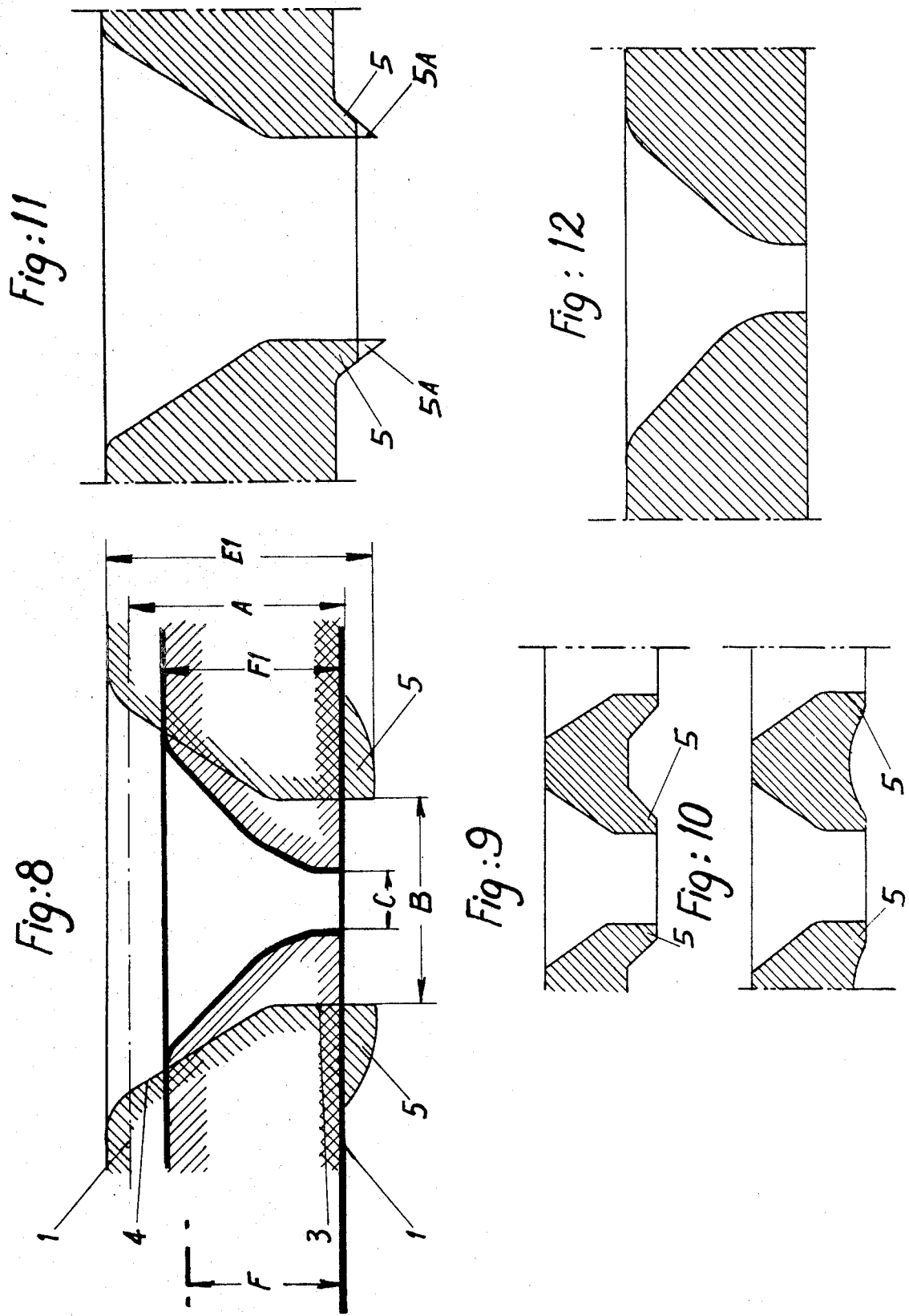

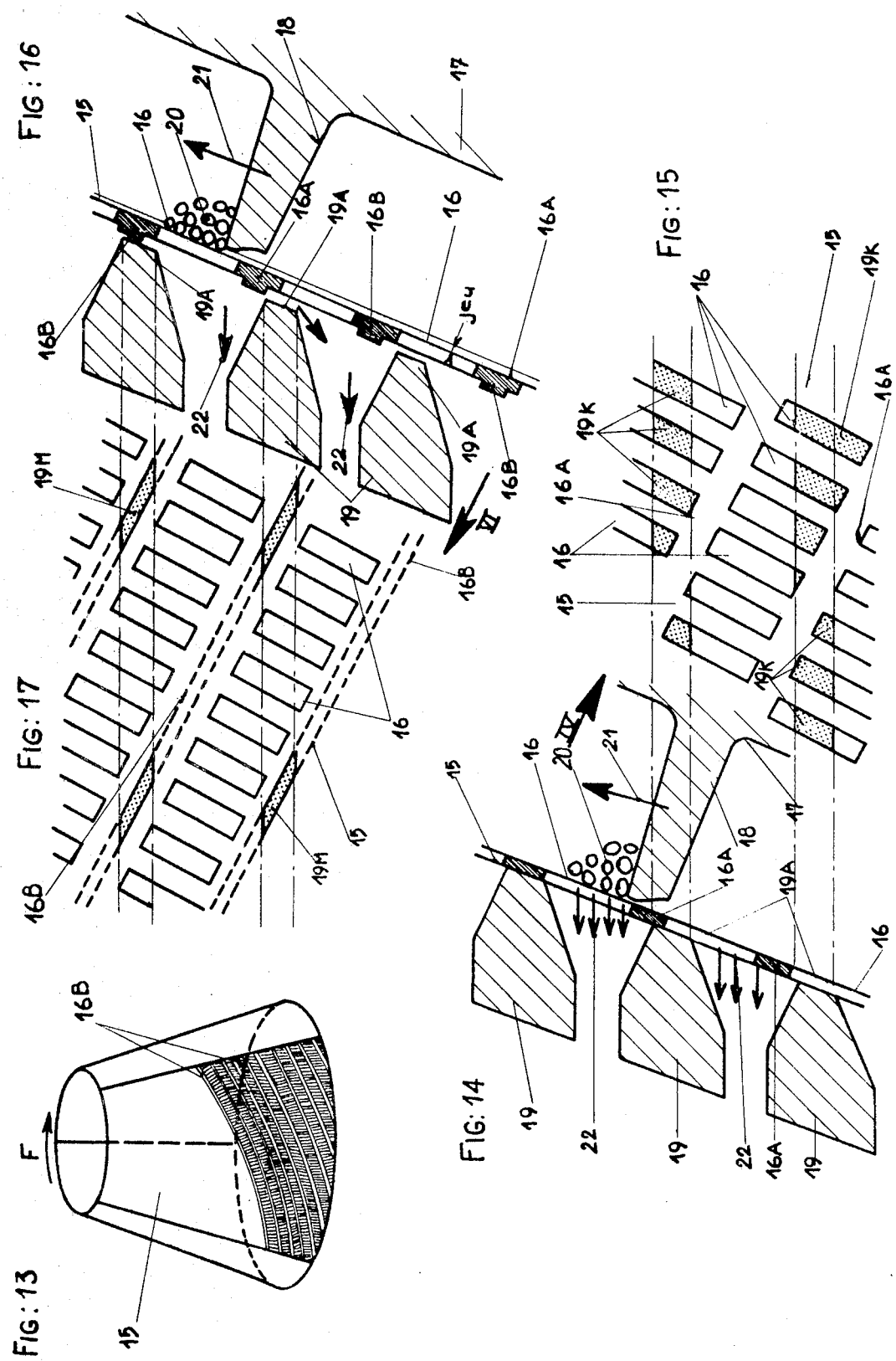

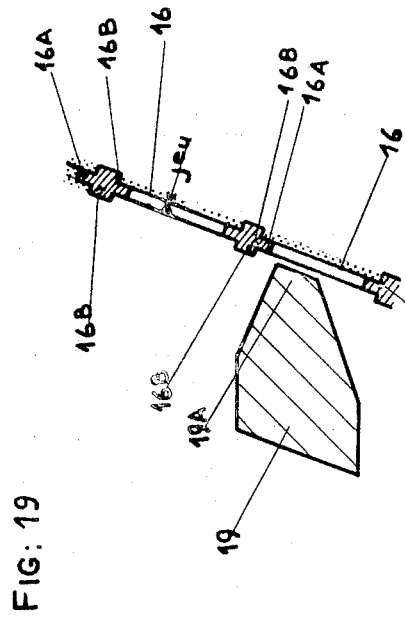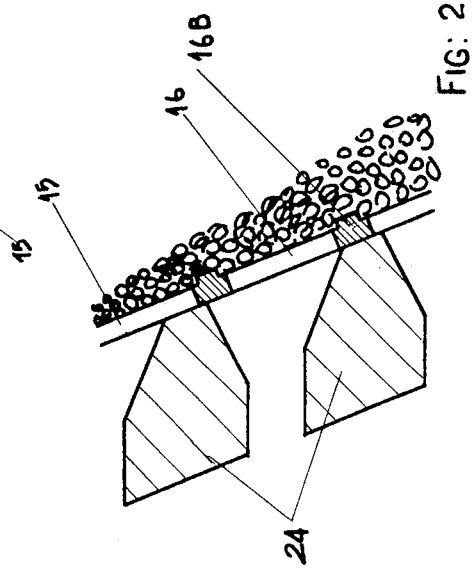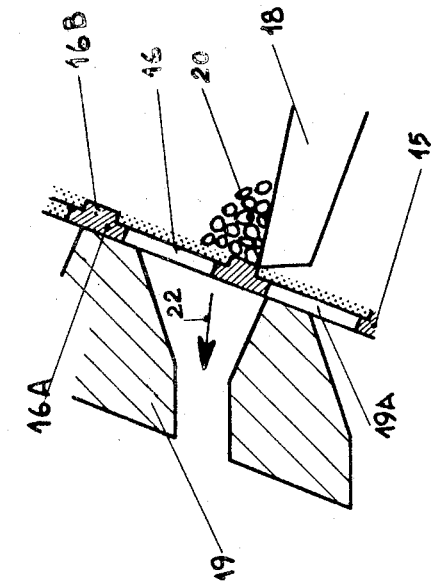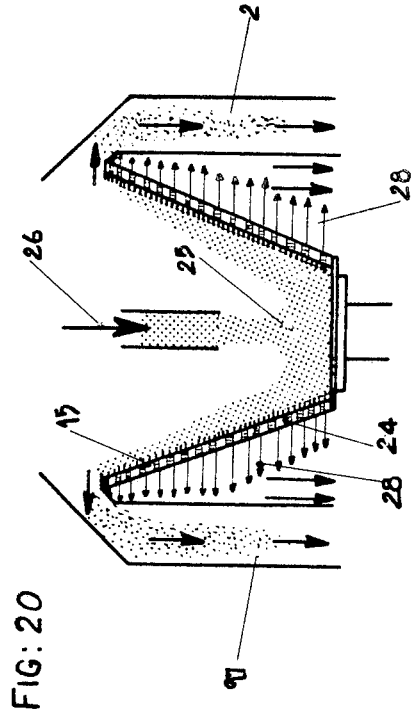

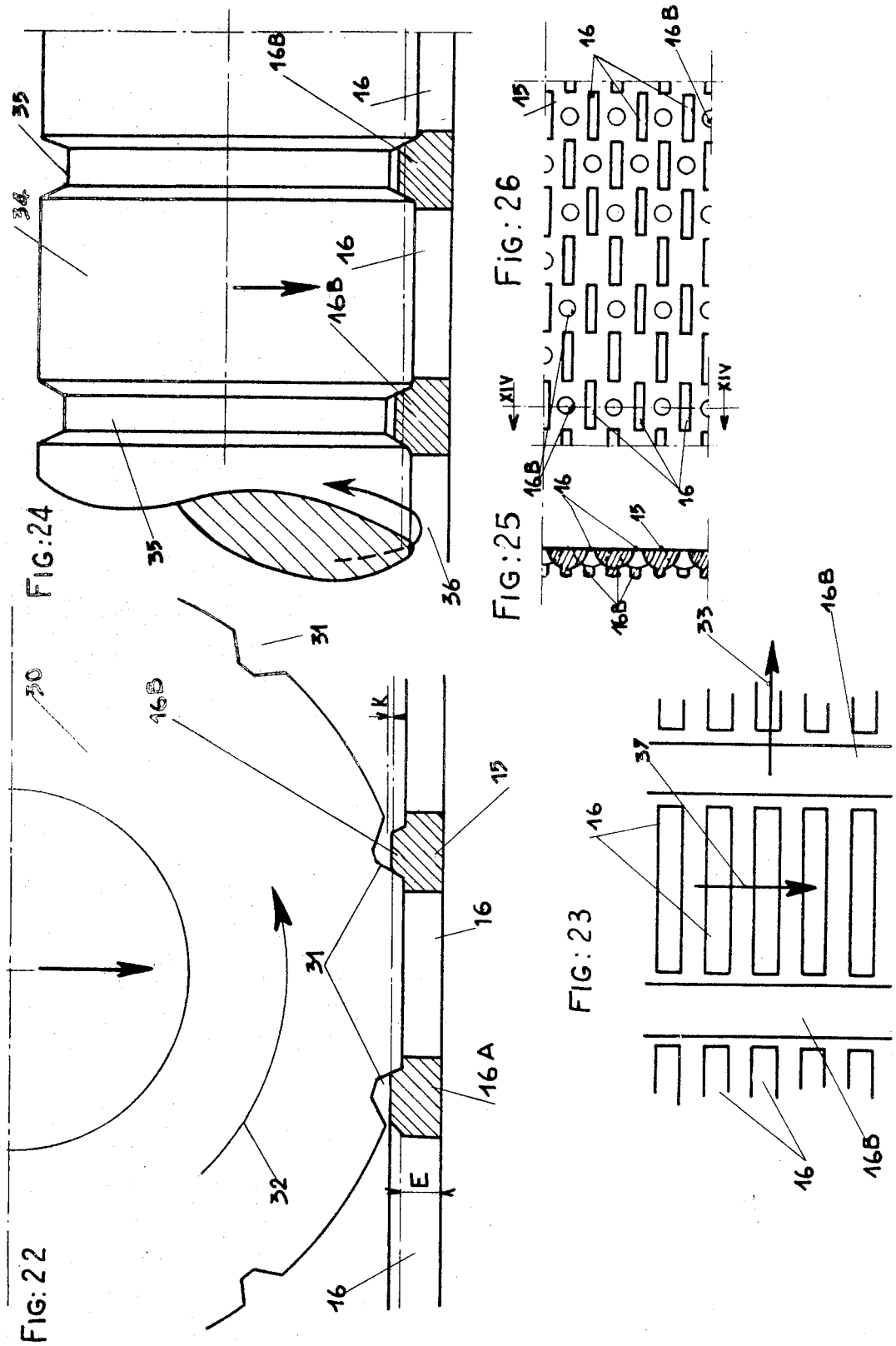

3,520,418
FILTER ELEMENTS AND THE MANUFACTURE THEREOF
Paul André Guinard, Saint-Cloud, Hauts-de-Seine, France, assignor to Etablissements Pompes Guinard, Saint-Cloud, France, a company of France
Filed Jan. 17, 1967, Ser. No. 609,859
Claims priority, application France, Jan. 25, 1966, 47,125; Nov. 23, 1966, 84,665
Int. Cl. B01d *39/10*
U.S. Cl. 210—498                                    4 Claims

ABSTRACT OF THE DISCLOSURE

This invention relates to filter elements of the type comprising a metal sheet or plate formed with rows of parallel slots which are initially punched out from the metal and subsequently reduced in width by deformation of the metal by the application of pressure. The metal sheet is provided on one or both of its faces with projections which act to space the filter element and, in particular the slots, from adjacent opposed surfaces which may be stationary or moving relative to the metal sheet. The projections are formed by or during the step of deforming the metal by suitably shaped punches, stamps or rollers or by electrolytic action or chemical etching.

BACKGROUND OF THE INVENTION

The present invention relates to filter elements of the type comprising a metal sheet or plate formed with slots arranged in parallel rows which are initially punched out from the metal and subsequently reduced in width by deformation of the metal by the application of pressure, e.g. by rolling the metal sheet. This enables fine slots to be produced whilst allowing the slots to be initially formed by punches which are sufficiently robust for production on a commercial scale.

The metal deformation step, as hitherto, employed, has been performed in such a way that the thickness of the metal sheet has been reduced all over, i.e. not only in those zones containing the rows of slots but also in the unperforated areas. Such filter elements have a number of disadvantages arising partly from the fact that after the rolling operation to deform the metal and reduce the width of the slots they may be so thin as not to be sufficiently mechanically strong or sufficiently corrosion resistant and partly from the fact that, when their surface is in contact with grid-like mounts or with moving parts serving to keep the material that is being filtered in motion (as is the case, for example, in centrifugal driers that employ frusto-conical baskets incorporating filters of this kind), part of the slot surface may be obstructed by the various grid-shaped members, so that the cross-sectional area of the passage through the filter is sometimes greatly reduced.

SUMMARY

The present invention aims at remedying the disadvantages referred to above, its distinguishing feature being that the said plate is provided, on at least one face, with projections situated between the slots, to act as separators or contact faces between the face or faces of the filter element and the adjacent moving or stationary surfaces.

The projections, provided on one face or both of the filter element, may consist of ribs or ridges disposed between the parallel rows of slots or between successive slots or, again, along the longer sides of each slot. They may also be formed by bosses or studs situated between the slots.

Where the projections consist of ribs or ridges separating the parallel rows of slots, they may be produced by re-rolling, or preferably by stamping the perforated filter plate only in the zones occupied by the slots. This method has the further advantage that the surface area of the non-pierced zones is not increased by this operation, so that the cross-sectional area of the passage through the slots, as a percentage of the total area of the plate, is greater than it would be otherwise.

Where the ribs or ridges are provided along the longer sides of the slots, they can be produced by a swaging operation, simultaneously with or consecutive upon punching, the swage being provided for the purpose with edge depressions corresponding to the ribs or ridges to be produced.

These ridged edges along the sides of the slots may be provided, for example, on one face of the filter element, while the ribs or ridges separating the rows of slots or separating the individual slots may be provided on the other face.

Finally, in the case of projections in the form of bosses or studs spaced between the slots, they can be produced by electrolytic action or chemical etching.

Further features, advantages and methods of application of the invention will be more clearly understood from the following description of various presently preferred embodiments, given by way of example only, reference being made to the accompanying drawings, in which:

FIG. 1 is a fragmentary large-scale cross-section of a filter element with normal slots;

FIG. 2 is a view similar to FIG. 1 but shows the slots widened out;

FIG. 3 is a perspective view of part of a plain stamp;

FIG. 4 is a fragmentary plan-view of a filter element, the slots in which have been reduced in width by the use of the stamp shown in FIG. 3;

FIG. 5 is a section taken on the line V—V in FIG. 4;

FIG. 6 is a perspective view of part of a crenellated stamp;

FIG. 7 is a fragmentary plan-view of a filter element, the slots in which have been reduced in width by the use of the stamp shown in FIG. 6;

FIGS. 8, 9 and 10 are large-scale cross-sections representing variants of FIG. 2;

FIG. 11 is a fragmentary large-scale cross-section of another type of filter element with the slots widened out, prior to reduction in the slot width;

FIG. 12 is a cross-section of the filter element shown in FIG. 11 after reduction in the slot width;

FIG. 13 is a perspective drawing of a frusto-conical filter element with inclined ridges;

FIG. 14 is a large-scale cross-section of part of a drier employing a filter having sheeting elements which have been perforated and then re-rolled;

FIG. 15 is a projection plan, following arrow IV, of the filter shown in FIG. 14;

FIG. 16 is a view corresponding to FIG. 14 and shows a filter made with sheeting elements perforated and then stamped only in the zones of the rows of slots;

FIG. 17 is a projection plan, following arrow VI, of the filter shown in FIG. 14;

FIG. 18 is a view corresponding to FIG. 16, the ridges being internal;

FIG. 19 is also a corresponding view, but with both internal and external ridges;

FIG. 20 is a diagrammatic cross-section of a centrifugal drier employing a ridged filter;

FIG. 21 is a cross-section, on an enlarged scale, of part of the drier shown in the previous drawing;

FIG. 22 shows, partially in section, the construction of a filter element made with a slotted roller;

FIG. 23 is a corresponding plan view of the filter element produced;

FIG. 24 shows, partially in section, the production of a filter element by means of a cylinder containing grooves;

FIG. 25 is a cross-section along the line XIV—XIV in FIG. 26 and shows a filter element obtained by electrolysis; and FIG. 26 is a plan of the filter element shown in FIG. 25.

In the examples illustrated in FIGS. 1 and 2, use is made of a sheet of metal 1, represented in chain-line, having a given thickness A. In the example shown in FIG. 1, multiple slots are punched in the metal sheet 1, the profile of one such slot being indicated at 2 by fine hatching and its width by B. To arrive at a predetermined lesser width C, it is necessary to reduce the metal sheet 1 to a thickness D by stamping or rolling. The final shape is shown in thicker line.

In the example shown in FIG. 2, the initial slot is not simply punched out, as in the case of FIG. 1, but is produced by punching at 3 and swaging in the widened zone 4. In the course of swaging, the material is displaced sideways, so that the sheet thickness, instead of remaining equal to A, has become E, which is greater than A. The shape of the material at this stage is indicated in thin line. Moreover, to avoid the need for using heavy presses and to enable the punches to be brought as closely together as possible, the slots are widened at an angle of 60°, whereas an angle of 90° would be desirable, to facilitate the evacuation of crystals during filtration work with filter elements such as here proposed.

Re-rolling the perforated sheet, such as illustrated in FIG. 2, in accordance with the invention, confers special technical advantages. To obtain the same reduction in slot width, from B to C, the number of re-rolling passes is smaller, as a result of which it is possible:

(1) To obtain a final thickness F distinctly greater than the thickness D, thereby greatly extending the life of the filter element:

(2) To increase the corrosion-resistance of such a filter element and hence also to extend its useful life, there being less extensive cold working of the material; and (3) To increase the angle at which the slots are widened, which, instead of being 60°, approaches the desired value of 90°.

The reduction in slot width by pressure, and more particularly by stamping, to produce the result shown in FIG. 2, offers advantages in comparison with that shown in FIG. 1. When stamping is adopted, the width L of the stamp used (10, in FIG. 3) may be the same as, but should preferably be a trifle greater than, the width of the slots, as indicated more particularly in FIGS. 4 and 5. Each row of slots is thus stamped in turn, so as to leave between any two adjacent rows a strip 11, in which the thickness is not reduced. This offers advantages over the rolling method of reduction, as the raised strips 11 help to strengthen the filter element, besides which there is no increase in the spacing between the rows of slots, as is the case with re-rolling, and the cross-sectional area of the passages through the slots represents a far higher percentage per unit area of surface.

Instead of a plain stamp, such as 10 in FIG. 3, a crenellated stamp such as 12, illustrated in FIG. 6, may be employed. If, as in the foregoing case, stamp 12 is a trifle wider than the slots are long, while the crenellations are slightly wider than the slots, raised portions are produced not only at 13, between adjacent rows of slots, but also at 14, between the slots themselves.

FIG. 8 illustrates another production method, in which the swages of the punching-and-swaging equipment used for slotting the sheet metal contain edge depressions for the formation of the "heels" 5, during the punching and swaging, this operation producing a thickness E1, slightly greater than thickness E in FIG. 2.

In the course of stamping or re-rolling, the metal of the heels 5 is forced back into the side walls of each slot. Thus, for a slot width C, identical to that obtained in the case of FIG. 2, a final thickness F1 is obtained, greater than thickness F, so that the properties of the metal are further improved as previously mentioned in connection with FIG. 2.

If stamping or re-rolling is carried out in precisely the same way as described in the case of FIG. 2, the heels not only enable the same final thickness F to be obtained, but also result in the slots being narrower than C. Again, the heels 5 shown in FIG. 8 are arc-shaped, with their face running perpendicular to the side faces round the slots. These rim heel-pieces 5 may, of course, be of any preferred shape, according to the tools used, the nature of the metal and the extent of reduction desired. Two other heel shapes are shown by way of example in FIGS. 9 and 10.

As illustrated more particularly in FIG. 11, the heels 5 are equivalent to wide burrs formed by the entry of the punches into dies or matrices which are bevelled to some extent. Here, in accordance with one special feature of the invention, the slotted sheet is subjected, prior to stamping or re-rolling, to heat or electrolytic treatment whereby the sharp angles 5A of the burr-shaped heels 5 can be burnt away, leaving behind only the bases, as can be seen more particularly from FIG. 11. Alternatively, the tops of the burrs may be levelled by buffing to a controlled thickness.

After stamping or re-rolling, the filter elements finally obtained have slots such as shown on a large scale in FIG. 12.

The substantially vertical parts of slots produced by punching-out are often scored or even contain furrows, which have the disadvantage that they hold back fine crystals. The rough surface formed in this way makes it easier for crystals to be caught up, so that the slots quickly become clogged. It has been found that these surface defects become even more pronounced during stamping or re-rolling. A special feature of the present invention is that, in order to obtain a good surface and thus enable the finer crystals to slide on the walls of the slots, a very fine abrasive powder is driven at high velocity, dry or wet, into the slots. This may be carried out either before or after, or both before and after, the stamping or re-rolling. This improvement in the surface condition of the slots is made possible only by the widening-out of the slots, which, by a funnelling action, enables the abrasive powder to retain sufficient velocity to exert its abrasive action and thus to polish the slot walls.

In the case of the drier, the head of which is shown partially in perspective in FIG. 13 and in section in FIGS. 14 and 15, the filter is numbered 15 and its slots 16. The inner component or scraper 17, generally fitted with helical blades 18, as well as the bar-type basket 19, which carries the filter 15, rotate at high speeds, these speeds differing only slightly so that the material 20 to be dried moves gradually in the direction of arrow 21.

In the example shown in FIG. 14, in which the filter 15 is made in layers, the gaps through which the liquid escapes in the direction of the arrows 22 are limited not only by parts 16A between slots 16, but also by the bearing faces 19A of the bars in the basket 19. These latter zones by which the flow passages are reduced are more clearly shown in FIG. 15, where they are shaded and numbered 19K.

In the example shown in FIG. 16, which uses a filter made with elements stamped to form ridges 16B, the escape path is limited only by parts 16A of the filter 15, because the inner faces 19A of the bars forming the basket lie only against the ridges 16B, which face the outside of the filter, and no longer against the filter slots 16. In FIG. 17, the areas obstructed, which are smaller than areas 19K in FIG. 15, are shown shaded at 19M.

As can be seen from FIG. 13, the ridges 16B may be inclined so as to increase or, on the contrary, to restrict sedimentation, according to the direction of rotation (arrow F), the slope being right-handed or left-handed, as the case may be.

FIG. 18 represents a variant of FIG. 16. In this case, the ridges 16B face towards the interior of the filter 15. FIG. 19 shows a further variant, in which the ridges 16B are formed on the inner and outer faces of the filter 15, thus combining the two results already described.

FIG. 20 is a diagrammatic representation of a centrifugal drier consisting of a container 24 containing a screen 15, the material 25 to be dried entering at 26. Centrifugal action causes the material to rise at the sides and escape at 27, the liquid being driven out at 28. To assist the flow of material or, on the contrary, to retard its evacuation, the ridges 16B of the filter 15 are arranged to face inwards and are inclined one way or the other at whatever angle suits the material being treated.

FIGS. 22 and 23 illustrate another method of carrying out the production of the filter elements 15 so as to produce ridges 16B between the rows of slots. In this example, a roller 30, the periphery of which contains slots 31, rotates in the direction of arrow 32, while the filter element 15 moves as indicated by the arrow 33. Element 15 could be passed between two rollers such as 30, to produce double ribs 16B. It will be noted that, as a result of the material being forced back, the thickness at the ridges 16B exceeds by K the initial thickness E of the perforated sheet.

FIG. 24 shows a variant in which use is made of a roller 34, containing grooves 35, which rotate in the direction of the arrow 36, while the element 15 (FIG. 23) is moving in the direction of arrow 37. The thickness reduction obtained with the aid of the roller 30 or of the roller 34 can be substituted for the stamping device of the previous examples.

FIGS. 25 and 26 illustrate a filter element 15 obtained by electrolysis with the apertures 16 arranged in staggered formation. Projections, such as 16B, are produced in the course of electrolysis on at least one face of the filter element.

The ribs obtained by stamping or with a slotted or grooved roller as already described may be continuous or discontinuous. In the latter case, the stamps, slots or grooves are of castellated shape.

What is claimed is:

1. A process of making a filter element comprising, providing a sheet of metal, punching separate slots in said sheet of metal arranged longitudinally in parallel rows and leaving areas free of slots intermediate the slots in the rows and intermediate successive rows of slots, reducing the thickness of the metal in the areas between the slots of the individual rows by stamping said areas independently of said punching and leaving between successive rows a continuous, longitudinal rib of greater thickness than the metal of the areas stamped, and during the stamping of the areas between the slots of the individual rows flowing metal inwardly of the slots to reduce the dimensions thereof substantially uniformly.

2. A process of making a filter element comprising providing a sheet of metal, punching separate slots in said sheet of metal arranged longitudinally in parallel rows and leaving areas free of slots intermediate the slots in the rows and intermediate successive rows of slots, reducing the thickness of the metal in marginal areas bounding the sides and ends of the slots by stamping said marginal areas independently of said punching and leaving between successive rows a continuous, longitudinal rib of greater thickness than the metal of the marginal areas stamped and ribs between the slots of the rows of greater thickness than the metal of the marginal areas stamped, and during the stamping of the marginal areas flowing metal inwardly of the slots to reduce the dimensions thereof substantially uniformly.

3. A filter element comprising, a sheet of metal having punched thereon a plurality of separate slots arranged in longitudinal, parallel rows and having areas free of slots intermediate the slots in the rows and intermediate successive rows of slots, said areas intermediate the slots in the rows having a reduced cross section reduced in thickness by stamping independently of the punching of the slots thereby defining areas longitudinally of the respective rows of reduced cross section, continuous ribs extending longitudinally between successive rows of slots having greater thickness than said areas of reduced cross section, and said slots being defined by stamped metal flowed uniformly, inwardly of the slots to reduce the dimensions of the slots originally punched, whereby the continuous, longitudinal ribs rigidify the filter element.

4. A filter element comprising a sheet of metal having punched thereon a plurality of separate slots arranged in longitudinal parallel rows and having areas free of slots intermediate the slots in the rows and intermediate successive rows of slots, said areas intermediate the slots in the rows and areas intermediate the rows having stamped marginal areas of reduced cross section and disposed circumferentially of each slot and bounding the sides and ends of the individual slots, continuous parallel ribs extending longitudinally between successive rows having greater thickness than said marginal areas of reduced cross section, other ribs extending between the slots in said rows and between the parallel first-mentioned ribs having greater thickness than said marginal areas and said slots being defined by stamped metal of said marginal areas flowed, uniformly, inwardly of the slots to reduce dimensions of the slots originally punched, whereby the ribs rigidify the filter element.

References Cited

UNITED STATES PATENTS

| | | | |
|---|---|---|---|
| 258,516 | 5/1882 | Weston | 210—498 X |
| 2,246,380 | 6/1941 | Norris | 204—11 |
| 2,816,665 | 12/1957 | Layte et al. | 210—494 |
| 3,044,167 | 7/1962 | Mathieu | 29—163.5 X |

JAMES L. DeCESARE, Primary Examiner

U.S. Cl. X.R.

29—163.5; 210—380